United States Patent
Yang

(10) Patent No.: US 7,743,256 B2
(45) Date of Patent: Jun. 22, 2010

(54) METHOD FOR VERIFYING AUTHORIZED ACCESS

(76) Inventor: Vince Yang, No. 11-8, Alley 6, Neighborhood 8, Waiping Village, Beipu Township, Hsinchu County (TW)

( * ) Notice: Subject to any disclaimer, the term of this patent is extended or adjusted under 35 U.S.C. 154(b) by 1451 days.

(21) Appl. No.: 11/118,672

(22) Filed: May 2, 2005

(65) Prior Publication Data

US 2006/0248344 A1    Nov. 2, 2006

(51) Int. Cl.
    *G06F 21/00* (2006.01)
(52) U.S. Cl. .................. 713/182; 713/168
(58) Field of Classification Search ............. 713/182, 713/161, 164, 168
    See application file for complete search history.

(56) References Cited

U.S. PATENT DOCUMENTS

| | | | | |
|---|---|---|---|---|
| 4,858,121 A | * | 8/1989 | Barber et al. ............... 705/2 |
| 5,053,608 A | * | 10/1991 | Senanayake ............... 235/380 |
| 5,224,173 A | * | 6/1993 | Kuhns et al. ............... 382/116 |
| 5,337,358 A | * | 8/1994 | Axelrod et al. ............... 705/75 |

\* cited by examiner

*Primary Examiner*—Thomas Peeso
(74) *Attorney, Agent, or Firm*—Muncy, Geissler, Olds & Lowe, PLLC

(57) ABSTRACT

The present invention is related to a method for verifying authorized access, and is specifically a method for verifying authorized access with an improved means of inputting a password, so as to prevent a spectator observing the inputting process from learning the password, and to facilitate memorizing the password. In said method, a user memorizes as a 'user-friendly' password, in relation to a reference background predetermined by the user, at least one locations as assignable districts, their order, and their number, but inputs the password by inputting codes that are shown at locations of the assignable districts consisting the memorized password. These codes are randomly determined and shown to the user, so that the codes as password change each time whenever the user asks to enter the system.

5 Claims, 5 Drawing Sheets

METHOD FOR VERIFYING AUTHORIZED ACCESS

BACKGROUND OF THE INVENTION

1. Field of the Invention

The present invention is related to a method for verifying authorized access, and is specifically a method for verifying authorized access with an improved means of inputting a password, so as to prevent a spectator of the inputting process from learning the password, and to facilitate memorizing the password.

2. Description of the Prior Art

Recently, motivated by the fast development and standardization of microelectronics, it has become very common to apply electronic password for verifying the identification of a user, which is almost a standard method for verifying authorized access. Because of its convenience and flexibility this kind of method for verifying authorized access has been applied in many buildings, offices, or common houses. Furthermore, this kind of method has been applied more broadly on computers and various control systems connected by networks, so as to assure the privacy of personal data, or to provide paid information service to specific users by verifying user's identification with a password.

Because of the mentioned convenience and flexibility and the fast development of networks at the meantime the use of electronic password has been becoming more and more frequent. Besides the means for verifying identification of a person asking for entrance, electronic password has been also applied in fields such as personal computers, workstations with multiple users, websites providing data with limited access, or portable electronic devices such as cell phones and personal digital assistants (PDA) wherever the privacy of personal data is to be protected. More recently, assisted by the fast improvements of wireless transfer techniques, portable electronic devices as mentioned above have been able to efficiently exchange information with various server systems for storing bulk data. Therefore, in terms of login into servers with bulk data by way of wireless network, users of portable electronic devices can reach personal data saved on server systems or check real-time information such as news of the day, without any limitations of the time or the location where the users are. Because information itself has market value or its privacy has to be protected, a method of verifying authorized access is obviously unavoidable when electronic information is provided, administrated, and transferred. Here, the most common means is to use electronic password in a method for verifying authorized access. In the highly virtualized modern life, therefore, the broad use of electronic password has become a sign of the present time.

It is trivial that to maintain the privacy of password is presupposed for its effectively protecting user's rights. There have been many inventions devoting to protecting password while being transferred in networks. Their main means is to design new software or hardware, so as to prevent a third person from catching the password during its transfer, or to make a decoding of the password more difficult. However, even if these designs make password safe during the transfer in networks, it is still possible that a spectator learns the password directly by observing the inputting process, especially when the inputting operation has to be performed in a circumstance where the existence of spectators can not be excluded completely, such as using public computers or work stations in a public area like library or an office. Often, authorized persons input password for entering an area or a house with limited access when spectators do exist. Furthermore, when operating the very common Automatic Teller Machine (ATM) it exists the same problem. These examples are very common in the modern and information-intensive daily life and some working fields. Therefore, a solution is needed to prevent a spectator of the process of inputting a password from learning the password. In addition to the safety problem of the password's privacy, for many users, the traditional password using a sequence of alpha-numeric characters is difficult to remember. A further problem of the traditional password is that a sequence of alpha-numeric characters is possible to be learned by an automatic program repeating trying to enter the system. Therefore, the traditional password is also disadvantageous when a hacker tries to infringe through networks.

An alternative way of using graphical password to verify authorized access has been known for solving the above-mentioned problems of the traditional password that is difficult to remember and can not effectively prevent from network infringements. By this means of entering a password a user is required to touch or select in an displayed graphical image predetermined areas in a predetermined sequence. In this means of using graphical password the user has to touch specified areas on a touch-sensitive display panel or move cursors to select specified areas of an image. Therefore, a spectator observing the entering process can still learn the entered password. On the other hand, in a further alternative means for entering password a password entry system displays a matrix of random ordered alpha-numeric characters and requires a user to press a dedicated row or column button for each character of the memorized password appearing in that row/column. In this means of using matrix of random ordered alpha-numeric characters the password used is a sequence of alpha-numeric characters as the traditional password and has the disadvantage of being difficult to remember.

BRIEF DESCRIPTION OF THE DRAWINGS

Figure 4:
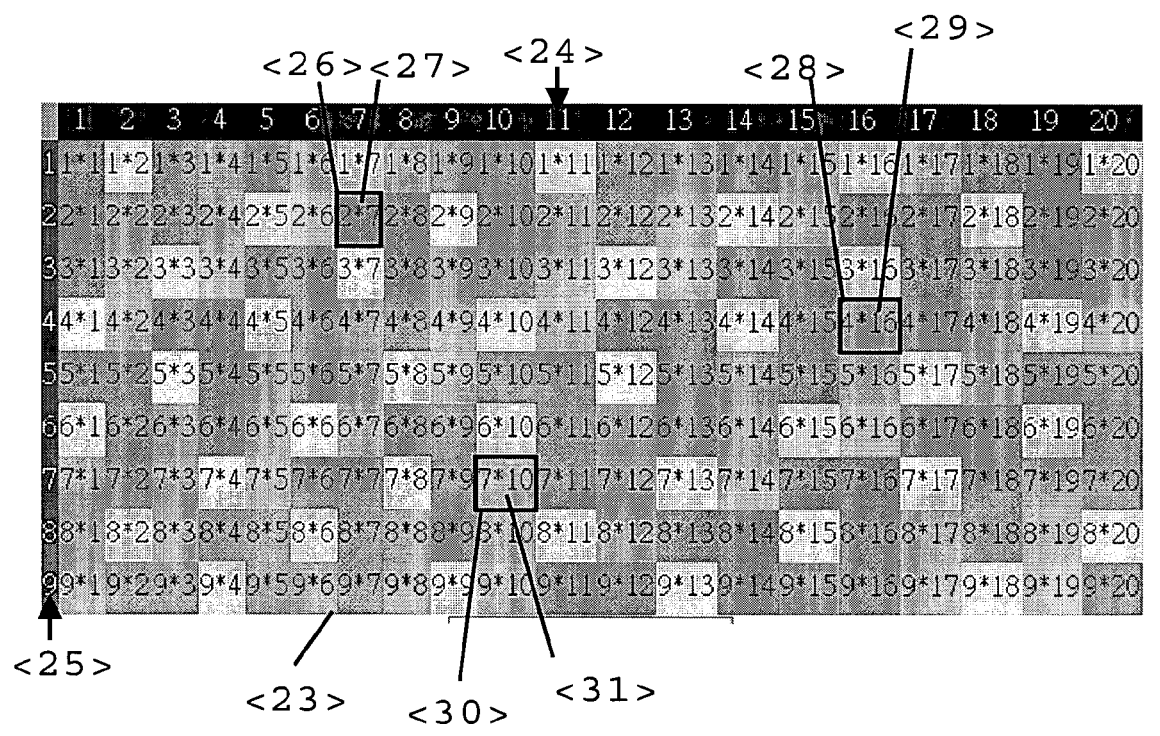

FIG. 4 illustrates assignable districts and district codes with a preferred embodiment of the present invention wherein the reference background consists of colored regions.

Figure 5:
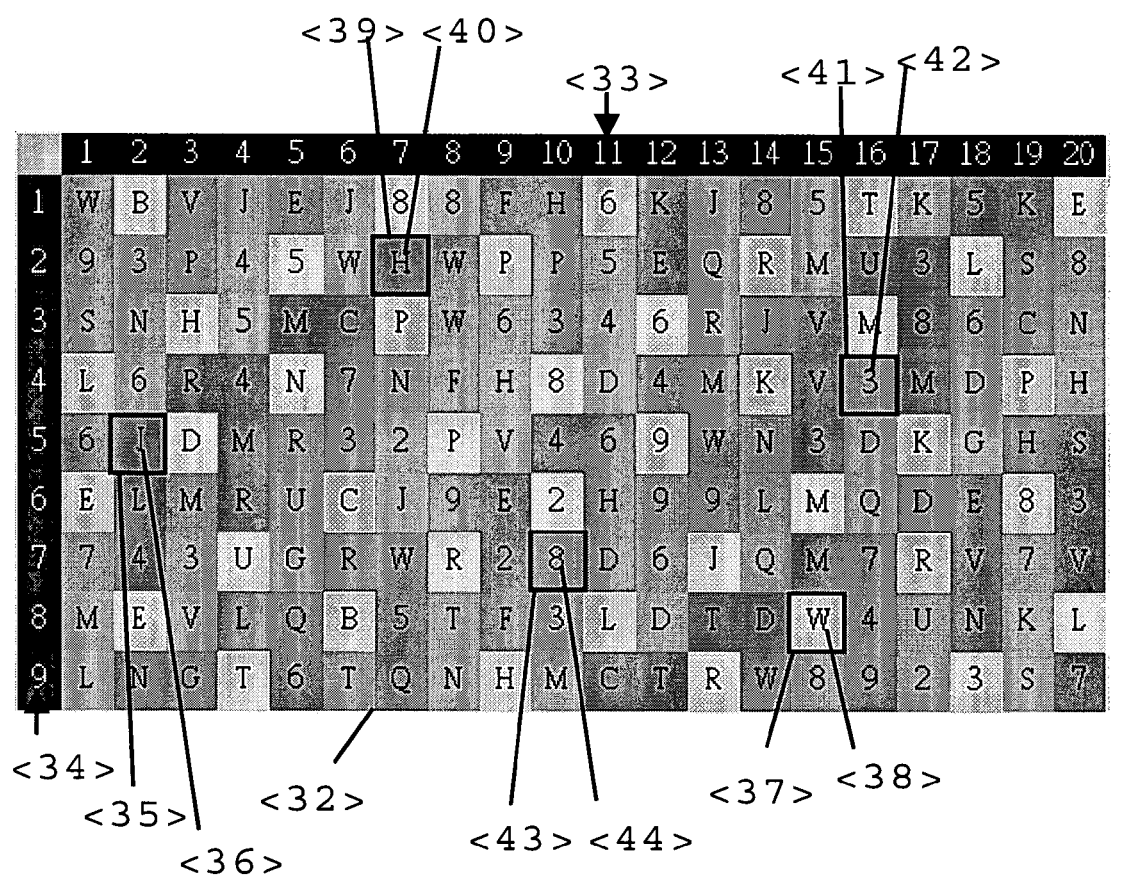

FIG. 5 illustrates a preferred embodiment of the present invention wherein the reference background consists of colored regions.

DETAILED DESCRIPTION OF THE INVENTION

Being directed against the disadvantages of the prior art described above, the present invention is devoted to solving the following problems: preventing a spectator observing the inputting process from learning the password, facilitating the memorizing of a password, and avoiding infringements, especially through networks. Therefore, a purpose of the present invention is to provide a method for verifying authorized access, so as to prevent a spectator observing the inputting process from learning the password, and to facilitate memorizing the password.

For fulfilling the purpose mentioned above, in the present invention, a user memorizes as a 'user-friendly' password, in relation to a reference background predetermined by the user, at least one locations as assignable districts, their order, and their number, but inputs the password by inputting codes that are shown at locations of the assignable districts consisting the memorized password. These codes are randomly determined and shown to the user, so that the codes as password change each time whenever the user asks to enter the system.

A method for verifying authorized access of the present invention comprises the steps of:

(1) inputting a user identification by a user;
(2) determining whether said user identification is an authorized user identification, if positive, then proceeding to step (4), if negative, then proceeding to the next step
(3) displaying an image according to a predetermined reference background to indicate an inputting rule for assignable districts of said reference background, so as to facilitate inputting and setting of a password which consists of one or multiple said assignable districts;
(4) displaying an dynamically constructed image according to a predetermined reference background to indicate an inputting rule that is produced dynamically and corresponds to assignable districts of said reference background, so as to facilitate inputting of a password, and then proceeding to verify validity of said password;
(5) End.

Figure 1:
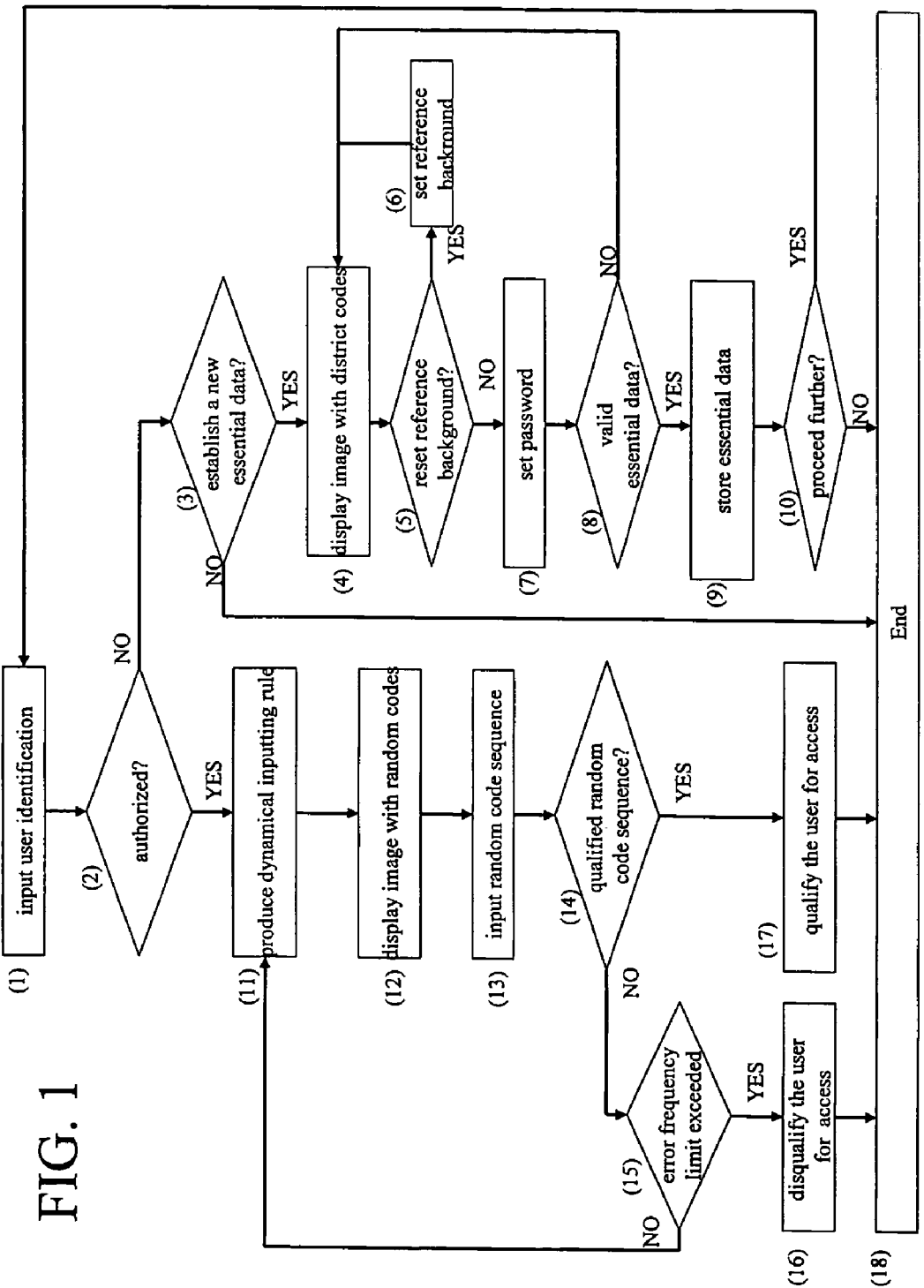
FIG. 1 is a block diagram showing the flow chart of a method for verifying authorized access of the present invention.
Figure 2:
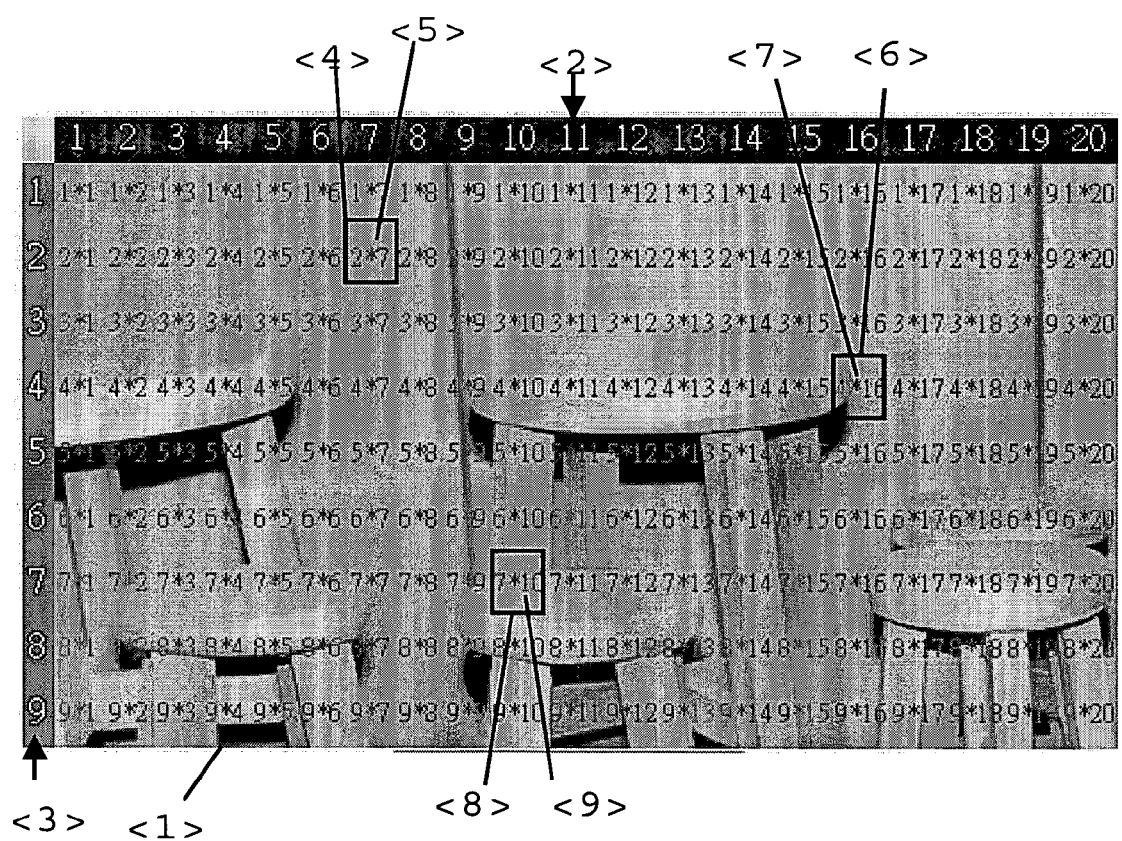
FIG. 2 illustrates assignable districts and district codes with a preferred embodiment of the present invention wherein the reference background is a picture.
Figure 3:
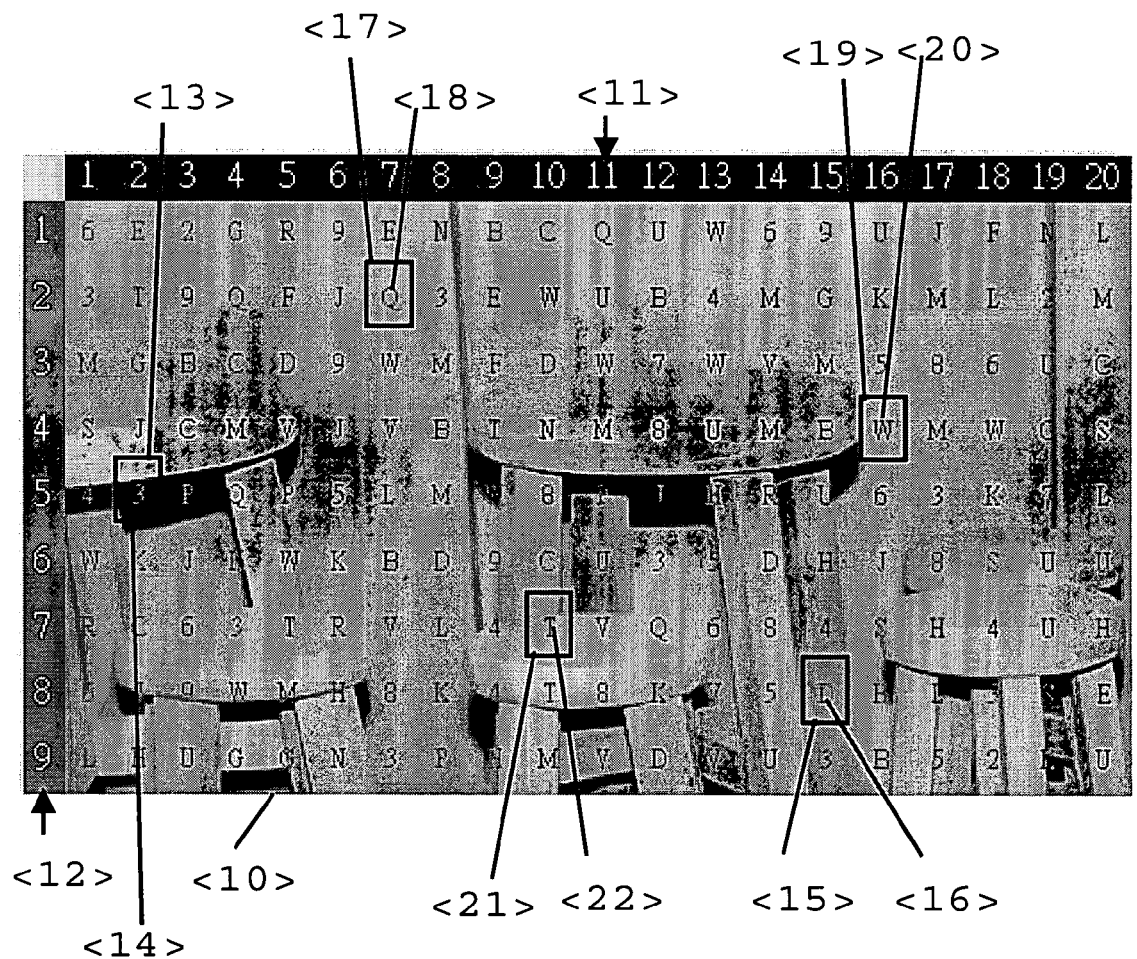
FIG. 3 illustrates a preferred embodiment of the present invention wherein the reference background is a picture.

Embodiment of the Present Invention: a Method for Verifying Authorized Access with a Picture as Reference Background FIG. 1 is a block diagram showing the flow chart of a method for verifying authorized access of the present invention, wherein an image is taken as a reference background. Said method comprises the steps of:

(1) inputting a user identification by a user in terms of using an input/output device which is connected to a system for verifying authorized access, e.g. a keyboard;
(2) determining whether said user identification is an authorized user identification, if positive, then proceeding to step (11), if negative, then proceeding to the next step; this determination is made by comparing with a user data stored in a storing device, and said storing device is a remote memory device connected through networks to said system for verifying authorized access, or a local memory device connected directly to said system for verifying authorized access;
(3) determining by the user whether to establish a new essential data, if positive, then proceeding to the next step, if negative, then proceeding to step (18);
(4) displaying an image containing a predetermined reference background and district codes, said reference background being a picture, individual said district code respectively being corresponding to one assignable district of said reference background and being distinguishable from a district code corresponding to any other assignable districts; specifically, as shown in FIG. 2 which illustrates assignable districts and district codes with a preferred embodiment of the present invention wherein the reference background <1> is a picture, said reference background is set to consist of 20 ×9 assignable districts arranged in 20 columns and 9 rows obtained by dividing the picture in length and breadth into rectangular regions of equivalent dimensions, and said district code is set as a binary sequence, n*m, that is formed by a column number <2>, m, and a row number <3>, n, of corresponding said assignable district, wherein m, and n are natural numbers, and $1 \leq m \leq 20$, $1 \leq n \leq 9$; what should be noted is that so long as there exists a one-to-one relation between the district codes and the assignable districts, the representation of the district codes is not limited by FIG. 2, e.g. in the present embodiment, the district codes of the 20×9 rectangular assignable districts arranged in 20 columns and 9 rows can also be set simply as a natural number, p, $1 \leq p \leq 180$, wherein each value of p corresponds in a one-to-one relation to an assignable district;
(5) determining by the user whether to reset the reference background, if positive, then proceeding to the next step, if negative, then proceeding to step (7);
(6) setting of the reference background by the user, then proceeding to step (4), specifically the user is allowed to select the reference background from multiple predetermined pictures, or to input a picture file as the reference background;
(7) inputting by the user a district sequence as password in terms of inputting corresponding said district codes, said district sequence as password being a sequence consisting of one or multiple said assignable districts of the reference background, and the user inputting said assignable districts by inputting corresponding district code, n*m; as examples shown in FIG. 2, a district sequence as password is selected by the user to consist of three assignable districts <4>, <6>, and <8> in order, therefore, the user should input in order 2*7 <5>, 4*16 <7>, and 7*10 <9> for inputting the district sequence as password; what should be noted is that so long as there exists a one-to-one relation between the district codes and the assignable districts, the representation and inputting means of the district codes are not limited by FIG. 2, e.g. in the present embodiment, the district codes of the 20×9 rectangular assignable districts arranged in 20 columns and 9 rows can also be set simply as a natural number, p, $1 \leq p \leq 180$, wherein each value of p corresponds in a one-to-one relation to an assignable district;
(8) determining whether an essential data is valid according to predetermined requirements, if positive, then proceeding to the next step, if negative, then proceeding to step (4), said essential data comprising said user identification, said reference background, data related to defining said assignable districts, and said district sequence as password etc.;
(9) storing the essential data into the storing device, said essential data comprising user identification, said reference background, data related to defining assignable districts, and district sequence as password etc., and said storing device being a remote memory device connected through networks to said system for verifying authorized access, or a local memory device connected directly to said system for verifying authorized access;
(10) determining by the user whether to proceed, if positive, then proceeding to step (1), if negative, then proceeding to step (18);
(11) dynamically producing, according to the predetermined essential data corresponding to the user identification, a dynamical inputting rule which determines random codes corresponding to assignable districts; specifically, as shown in FIG. 3, the reference background <10> is a predetermined picture having been set to consist of 20×9 rectangular assignable districts arranged in 20 columns and 9 rows that are rectangular regions of equivalent dimensions, and the district code is set as a binary sequence, n*m, that is formed by a column number <11>, m, and a row number <12>, n, of the corresponding assignable district, wherein m and n are natural numbers, and $1 \leq m \leq 20$, $1 \leq n \leq 9$, and the random code is an alpha-numeric character which is randomly determined; e.g., the random code corresponding to the assignable district <13> with the district code of 5*2 is '3' <14>, the random code corresponding to the assignable district <15> with the district code of 8*15 is 'D' <16>;

(12) displaying an image containing the reference background and the random codes produced in step (11), so that individual said random codes are positioned at locations of the corresponding assignable districts, respectively, in relation to the scope of said reference background; specifically, as shown in FIG. 3 which illustrates a preferred embodiment of the present invention wherein the reference background is a picture, the reference background <10> is set to consist of 20×9 rectangular assignable districts arranged in 20 columns and 9 rows obtained by dividing the predetermined picture in length and breadth into rectangular regions of equivalent dimensions, and the district code is set as a binary sequence, n*m, that is formed by a column number <11>, m, and a row number <12>, n, of the corresponding assignable district, wherein m and n are natural numbers, and $1 \leq m \leq 20$, $1 \leq n \leq 9$, and the random code is an alpha-numeric character that is randomly determined in step (11) and is shown at the location of the corresponding assignable district, e.g., the random code corresponding to the assignable district <13> with the district code of 5*2 is '3' <14>, and the random code corresponding to the assignable district <15> with the district code of 8*15 is 'D' <16>; what should be noted is that the shapes of the assignable districts, their arrangement, and the representation of the random codes in the displayed image are not limited in the present invention by FIG. 3, e.g., the individual random codes can be represented with arbitrary deformations and/or rotations; what should be noted is that in the present invention the way to form the image containing the reference background and the random codes is not limited, e.g., the random codes can be displayed as separated units covering parts of the reference background, or the random codes can also be combined with the reference background to form a new picture as one unit, so as to prevent from infringements through networks more effectively;

(13) inputting a random code sequence to be verified by using said input/output device to input one or multiple random codes in proper order;

(14) producing a password random code sequence according to the predetermined district sequence as password and the dynamical inputting rule, and then determining whether the random code sequence to be verified equals the password random code sequence, if positive, then proceeding to step (17), if negative, then proceeding to the next step; specifically, as shown in FIG. 3, the predetermined district sequence as password contains in order the assignable districts <17>, <19>, and <21> with the district code 2*7, 4*16, and 7*10 (compare FIG. 2 and step (7)), therefore, according to the dynamical inputting rule displayed in FIG. 3, the corresponding random codes in order are 'Q' <18>, 'W' <20>, and 'T' <22>, and the password random code sequence is 'QWT';

(15) determining whether the error frequency is greater than a predetermined value, e.g. 3 times, if positive, then proceeding to the next step, if negative, then proceeding to step (11);

(16) setting said user as disqualified for authorized access, proceeding to step (5);

(17) setting said user as qualified for authorized access, proceeding to step (5).

(18) End.

Embodiment of the Present Invention: A Method for Verifying Authorized Access with a Reference Background Consisting of Colored Regions FIG. 1 is a block diagram showing the flow chart of a method for verifying authorized access of the present invention, wherein colored regions are taken to form a reference background. Said method comprises the steps of:

(1) inputting a user identification by a user in terms of using an input/output device which is connected to a system for verifying authorized access, e.g. a keyboard;

(2) determining whether said user identification is an authorized user identification, if positive, then proceeding to step (11), if negative, then proceeding to the next step; this determination is made by comparing with a user data stored in a storing device, and said storing device is a remote memory device connected through networks to said system for verifying authorized access, or a local memory device connected directly to said system for verifying authorized access;

(3) determining by the user whether to establish a new essential data, if positive, then proceeding to the next step, if negative, then proceeding to step (18);

(4) displaying an image containing a predetermined reference background and district codes, said reference background consisting of multiple colored regions as assignable districts, individual said colored region exhibiting a color that is randomly determined, and individual said district code respectively being corresponding to one assignable district of said reference background and being distinguishable from a district code corresponding to any other assignable districts; specifically, as shown in FIG. 4 which illustrates assignable districts and district codes with a preferred embodiment of the present invention wherein the reference background <23> consists of 20×9 rectangular regions as assignable districts which have equivalent shapes and are colored and arranged in 20 columns and 9 rows, the color of an individual said rectangular region being randomly determined, and said district code is set as a binary sequence, n*m, that is formed by a column number <24>, m, and a row number <25>, n, of corresponding said assignable district, wherein m, and n are natural numbers, and $1 \leq m \leq 20$, $1 \leq n \leq 9$; what should be noted is that so long as there exists a one-to-one relation between the district codes and the assignable districts, the representation of the district codes is not limited by FIG. 4, e.g. in the present embodiment, the district codes of the 20×9 rectangular assignable districts arranged in 20 columns and 9 rows can also be set simply as a natural number, p, $1 \leq p \leq 180$, wherein each value of p corresponds in a one-to-one relation to an assignable district;

(5) determining by the user whether to reset the reference background, if positive, then proceeding to the next step, if negative, then proceeding to step (7);

(6) proceeding to step (4) to reset the reference background, wherein the producing of randomly determined colors of the assignable districts is effectively to form a new color combination among the assignable districts, so as to facilitate choosing locations for the password that have appropriate colors and are easy to memorize by the user;

(7) inputting by the user a district sequence as password in terms of inputting corresponding said district codes, said district sequence as password being a sequence consisting of one or multiple said assignable districts of the reference background, and the user inputting said assignable districts by inputting corresponding district code, n*m; as examples shown in FIG. 4, a district sequence as password is selected by the user to consist of three assignable districts <26>, <28>, and <30> in order, therefore, the user should input in order 2*7 <27>, 4*16 <29>, and 7*10 <31> for inputting the district sequence as password; what should be noted is that so long as there exists a one-to-one relation between the district codes and the assignable districts, the representation and inputting means of the district codes are not limited by FIG. 4, e.g. in the present embodiment, the district codes of the 20×9 rectangular assignable districts arranged in 20 columns and 9 rows can also be set simply as a natural number, p, $1 \leq p \leq 180$, wherein each value of p corresponds in a one-to-one relation to an assignable district;

(8) determining whether an essential data is valid according to predetermined requirements, if positive, then proceeding to the next step, if negative, then proceeding to step (4), said essential data comprising said user identification, said reference background, data related to defining said assignable districts including their predetermined colors, and said district sequence as password etc.;

(9) storing the essential data into the storing device, said essential data comprising user identification, said reference background, data related to defining assignable districts including their predetermined colors, and district sequence as password etc., and said storing device being a remote memory device connected through networks to said system for verifying authorized access, or a local memory device connected directly to said system for verifying authorized access;

(10) determining by the user whether to proceed, if positive, then proceeding to step (1), if negative, then proceeding to step (18);

(11) dynamically producing, according to the predetermined essential data corresponding to the user identification, a dynamical inputting rule which determines random codes corresponding to assignable districts; specifically, as shown in FIG. 5 which illustrates a preferred embodiment of the present invention wherein the reference background <32> consists of 20×9 rectangular regions as assignable districts which have equivalent shapes and are colored and arranged in 20 columns and 9 rows, and the color of each individual said rectangular region being set according to the predetermined essential data, and the district code is set as a binary sequence, n*m, that is formed by a column number <33>, m, and a row number <34>, n, of the corresponding assignable district, wherein m and n are natural numbers, and $1 \leq m \leq 20$, $1 \leq n \leq 9$, and the random code is an alpha-numeric character which is randomly determined, e.g., the random code corresponding to the assignable district <35> with the district code of 5*2 is 'J' <36>, and the random code corresponding to the assignable district <37> with the district code of 8*15 is 'W' <38>;

(12) displaying an image containing the reference background and the random codes produced in step (11), so that individual said random codes are positioned at locations of the corresponding assignable districts, respectively, in relation to the scope of said reference background; specifically, as shown in FIG. 5 which illustrates a preferred embodiment of the present invention wherein the reference background <32> is set to consist of 20×9 rectangular regions as assignable districts which have equivalent shapes and are colored and arranged in 20 columns and 9 rows, and the district code is set as a binary sequence, n*m, that is formed by a column number <33>, m, and a row number <34>, n, of the corresponding assignable district, wherein m and n are natural numbers, and $1 \leq m \leq 20$, $1 \leq n \leq 9$, and the color of each individual said rectangular region being set according to the predetermined essential data, and the random code is an alpha-numeric character that is randomly determined in step (11) and is shown at the location of the corresponding assignable district, e.g., the random code corresponding to the assignable district <35> with the district code of 5*2 is 'J' <36>, and the random code corresponding to the assignable district <37> with the district code of 8*15 is 'W' <38>; what should be noted is that the shapes of the assignable districts, their arrangement, and the representation of the random codes in the displayed image are not limited in the present invention by FIG. 5, e.g., individual assignable district can be regions of arbitrary and different sizes and shapes, and the individual random codes can be represented with arbitrary deformations and/or rotations; what should be noted is that in the present invention the way to form the image containing the reference background and the random codes is not limited, e.g., the random codes can be displayed as separated units covering parts of the reference background, or the random codes can also be combined with the reference background to form a new picture as one unit, so as to prevent from infringements through networks more effectively;

(13) inputting a random code sequence to be verified by using said input/output device to input one or multiple random codes in proper order;

(14) producing a password random code sequence according to the predetermined district sequence as password and the dynamical inputting rule, and then determining whether the random code sequence to be verified equals the password random code sequence, if positive, then proceeding to step (17), if negative, then proceeding to the next step; specifically, as shown in FIG. 5, the predetermined district sequence as password contains in order the assignable districts <39>, <41>, and <43> with the district code 2*7, 4*16, and 7*10 (compare FIG. 4 and step (7)), therefore, according to the dynamical inputting rule displayed in FIG. 5, the corresponding random codes in order are 'H' <40>, '3' <42>, and '8' <44>, and the password random code sequence is 'H38';

(15) determining whether the error frequency is greater than a predetermined value, e.g. 3 times, if positive, then proceeding to the next step, if negative, then proceeding to step (11);

(16) setting said user as disqualified for authorized access, proceeding to step (5);

(17) setting said user as qualified for authorized access, proceeding to step (5).

(18) End.

The present invention is related to a method for verifying authorized access, and is mainly applicable on equipments for verifying user's identification by using electronic passwords. By taking a sequence consisting of assignable districts of a reference background as the password and requiring the user to input the password by inputting dynamically determined random codes corresponding to the predetermined sequence of assignable districts as password, the present method has an advantage that it is hardly possible for a spectator observing the inputting process to learn the password. Especially under circumstances where it is usually difficult to prevent from other persons from observing the inputting process of a password, e.g. the using of a password for entrance into private houses or buildings with limited access, various software systems, computer information servers, personal digital assistants (PDA) that can directly store or receive through networks data with privacy or commercial value, and automatic teller machines (ATM), the present invention provides excellent protection of password. Furthermore, by setting the password as a sequence of assignable districts of a reference background that can be arbitrarily selected by the user to be a familiar picture or any other colored patterns, the present invention facilitates memorizing the password and makes it more difficult for a program to enter a protected system by trying automatically and repeatedly to log in.

While the present invention has been illustrated with the preferred embodiments as described above, it will be understood by those skilled in the art that the foregoing and other changes in form and details may be made therein without departing from the spirit and scope of the present invention which should be limited only by the scope of the appended claims.

What is claimed is:

1. A method for verifying authorized access by creating a password inputting rule for assignable districts of a predetermined reference background, the method comprising the steps of:
   1) inputting a user identification by a user;
   (2) determining whether the user identification is an authorized user identification, if positive, then proceeding to step (41), if negative, then proceeding to the next step;
   (3) displaying an image according to a predetermined reference background to indicate an inputting rule for assignable districts of the reference background, so as to facilitate inputting and setting of a password which consists of one or multiple the assignable districts;
   (4) displaying a dynamically constructed image according to a predetermined reference background to indicate an inputting rule that is produced dynamically and corresponds to assignable districts of the reference background, so as to facilitate inputting of a password, and then proceeding to verify validity of the password, wherein the step (4) further comprises the steps of:
   (41) dynamically producing the inputting rule to determine random codes corresponding to assignable districts, these assignable districts including all assignable districts contained in predetermined district sequence as password;
   (42) displaying an image containing a predetermined reference background corresponding to the user identification and the random codes determined in step (41), so that individual the random codes are positioned respectively to corresponding assignable districts that are corresponding to the scope of the reference background;
   (43) inputting a random code sequence as to be verified, the random code sequence as to be verified including one or multiple the random codes;
   (44) producing a random code sequence as password according to predetermined the district sequence as password and the dynamical inputting rule, followed by determining whether the random code sequence as password equals the random code sequence as to be verified, if positive, then proceeding to step (47), if negative, then proceeding to the next step;
   (45) determining whether error frequency is greater than a predetermined value, if positive, then proceeding to the next step, if negative, then proceeding to step (41);
   (46) setting the user as disqualified for authorized access, proceeding to step (5);
   (47) setting the user as qualified for authorized access, proceeding to step (5); and
   (5) end of the process.

2. The method for verifying authorized access of claim 1, wherein said step (3) further comprises the steps of:
   (31) determining whether to establish a new essential data, if positive, then proceeding to the next step, if negative, then proceeding to step (5);
   (32) displaying an image containing a predetermined reference background and district codes, individual said district code respectively corresponding to one assignable district of said reference background and being distinguishable from a district code corresponding to any other assignable districts;
   (33) determining whether to reset reference background, if positive, then proceeding to the next step, if negative, then, proceeding to step (35);
   (34) setting of reference background, then proceeding to step (32);
   (35) inputting a district sequence as password in terms of inputting corresponding district codes;
   (36) determining whether an essential data is valid according to predetermined requirements, if positive, then proceeding to the next step, if negative, then proceeding to step (32), said essential data comprising said user identification, said reference background, data related to defining said assignable districts, and said district sequence as password;
   (37) storing said essential data, including said user identification, said reference background, data related to defining said assignable districts, and said district sequence as password;
   (38) determining whether to proceed further, if positive, then proceeding to step (1), if negative, then proceeding to step (5).

3. The method for verifying authorized access of claim 2, comprising between said step (31) and said step (32) a further step of:
   (311) setting said reference background to consist of M×N assignable districts arranged in M columns and N rows obtained by dividing a picture in length and breadth into rectangular regions of equivalent dimensions, and setting said district code as a binary sequence, n*m, that is formed by a column number, m, and a row number, n, of corresponding said assignable district, wherein M, N, m, and n are natural numbers, and $1 \leq m \leq M' 1 \leq n \leq N$.

4. The method for verifying authorized access of claim 2, comprising between said step (31) and said step (32) a further step of:
   (312) setting said reference background to consist of M×N assignable districts arranged in M columns and N rows that are rectangular regions of equivalent dimensions, individual said rectangular region exhibiting a color which is randomly determined, and said district code being set as a binary sequence, n*m, that is formed by a column number, m, and a row number, n, of corresponding said assignable district, wherein) M, N, m, and n are natural numbers, and $1 \leq m \leq M' 1 \leq n \leq N$.

5. The method for verifying authorized access of claim 1, said step (41) comprising a further step of:
   (411) setting said reference background, according to a predetermined essential data, to consist of M×N assignable districts arranged in M columns and N rows that are rectangular regions of equivalent dimensions, and setting said district code as a binary sequence, n*m, that is formed by a column number, m, and a row number, n, of corresponding said assignable district, wherein M, N, m, and n are natural numbers, and $1 \leq m \leq M' 1 \leq n \leq N$, and said random code being an alpha-numeric character which is randomly determined.

* * * * *